United States Patent
Accapadi

(10) Patent No.: US 7,486,810 B1
(45) Date of Patent: Feb. 3, 2009

(54) ON-TYPE BIOMETRICS FINGERPRINT SOFT KEYBOARD

(75) Inventor: Jos Manuel Accapadi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/108,510

(22) Filed: Apr. 24, 2008

(51) Int. Cl.
*G06K 9/00* (2006.01)

(52) U.S. Cl. .................................................. 382/124

(58) Field of Classification Search ................ 382/100, 382/115, 124; 358/1.15, 1.9; 709/203, 217, 709/230–231; 715/273
See application file for complete search history.

(56) References Cited

U.S. PATENT DOCUMENTS

| | | | |
|---|---|---|---|
| 6,006,328 A | 12/1999 | Drake | |
| 6,272,562 B1 | 8/2001 | Scott et al. | |
| 6,298,230 B1 | 10/2001 | Schneider-Hufschmidt | |
| 6,947,995 B2 * | 9/2005 | Chang et al. | 709/231 |
| 7,318,086 B2 * | 1/2008 | Chang et al. | 709/217 |
| 2002/0035542 A1 | 3/2002 | Tumey et al. | |
| 2004/0132490 A1 | 7/2004 | Jerbi et al. | |
| 2007/0132733 A1 | 6/2007 | Ram | |

* cited by examiner

*Primary Examiner*—Jose L Couso
(74) *Attorney, Agent, or Firm*—MaxValueIP, LLC

(57) ABSTRACT

One embodiment of this invention addresses the use of biometrics for accessing a touch screen keyboard on a tablet personal computer (PC), and ensuring security if the PC is left unattended. The core idea is to assign biometrics to soft keyboards without the use of a physical keyboard. In this example, every key on the keyboard will be assigned a biometric fingerprint associated with the corresponding finger that would type it. When a user types, a portion of its fingerprint touches the keys. By storing the portions and assigning the portions to the soft keyboard, it is ensured that every key typed is associated with the corresponding key fingerprint portion, thus ensuring maximum biometric security. In addition, the keystroke delays and word delays can be recorded and compared with previous data for added security.

1 Claim, 2 Drawing Sheets

ON-TYPE BIOMETRICS FINGERPRINT SOFT KEYBOARD

BACKGROUND OF THE INVENTION

Authentication methods have traditionally included usage of username and password along with other, sometimes optional, information about the user or the machine at the time of requesting access to computer systems or servers. In many cases, the servers are capable of request other information in order to grant admission to the entering machine or user. Of which, it includes checking the IP address or domain of the client while logging in. For added security, sometimes an expiration time has been added to the login sessions to disable the session in case a longer than expected time is needed by the client to login. In order to ensure automated and/or repeated login attempts, which can translate to problems for the security of the system, are prevented, in many cases the client is asked to identify a convoluted set of letters, numbers or signs shown in a picture believed to be easily recognizable only by human brain.

In other forms of added reliability and security for an authentication system, biometric fingerprint recognition has been used. Fingerprint (FP) recognition refers to methods used for determining the existence of a match between two human fingerprints. In these methods, several features of the FP are compared including the patterns and minutia features. The patterns include whorl, loop, and arch. Furthermore, FPs have unique minute features which belong to categories of ridge endings, bifurcations, and short ridges or dots. For the purposes of computer security or other similar applications, fingerprints are captured by sensors to create a digital image of the pattern. A biometric template is created by digitally processing the digital image to make available a collection of extracted features. This collection is used for matching. Common FP sensors include optical, ultrasonic, and capacitance sensors. The optical sensor, for instance, is essentially a specialized digital camera under a layer of transparent material. Finger is placed on the transparent material, surface of the finger is illuminated, and pictures are taken to be processed in the next stage.

A combination of the two authentication methods, namely the username/password method and the fingerprint recognition method would greatly increase the security of the system. Systems have been developed in which the two mentioned processes are performed serially. That is, for added security, one enters his/her username and password and then is prompted to put finger on a touch pad. This method is inconvenient, usually takes twice as much time as a regular authentication process and unavoidably reveals that a FP process is being performed.

Some of the known applications include a biometric reader, which the screen can be used for logging back, in case the user is locked out or has forgotten user name or password. In addition, timing defaults for enabling the screen to lock can be set. An additional solution is required for the cases that fall between the timing and forgetfulness periods for future tablet PCs.

SUMMARY OF THE INVENTION

One embodiment of this invention addresses the use of biometrics for accessing a touch screen keyboard on a tablet personal computer (tablet PC), while ensuring security if the PC is left unattended.

The core idea is to assign biometrics to soft keyboards without the use of a physical keyboard. In this example, every key on the keyboard will be assigned a biometric fingerprint associated with the corresponding finger that would type it.

When a user types, a portion of its fingerprint touches the keys. By storing the portions and assigning the portions to the soft keyboard, it is ensured that every key typed is associated with the corresponding key fingerprint portion, ensuring maximum biometric security.

In addition, the keystroke delays and word delays can be recorded and compared with previous data for added security.

DETAILED DESCRIPTION OF THE PREFERRED EMBODIMENTS

One embodiment of the present invention works with the use of a screen that acts as both a soft keyboard display and a biometric reader. The underlying display/scanning technology can be implemented through various methods to acquire the biometric fingerprint.

These methods include acquiring the biometric fingerprint with a combination of topological and contour mapping technology, with the acquisition of the biometric fingerprint on the soft keyboard and mapping to the soft keys.

In the latter, every key type would be verified against the biometric fingerprint association for the key for maximum security.

One embodiment of this invention addresses the use of biometrics for accessing a touch screen keyboard on a tablet PC, while ensuring security, when the PC is left unattended for an extended period of time.

The core idea is to assign biometrics to soft keyboards without the use of a physical keyboard. Essentially every key on the keyboard will be assigned a biometric fingerprint associated with the corresponding finger that would type it.

When a user types, a portion of its fingerprint touches the keys. By storing the portions and assigning the portions to the soft keyboard, it is ensured that every key typed is associated with the corresponding key fingerprint portion, thus ensuring maximum biometric security.

In addition, the keystroke delays and word delays can be recorded and compared with previous data for added security. Delay data is updated in the databases every time a user is successfully logged into the system to account for gradual change in user's behavior over time and to create a smooth curve for these changes.

Figure 1:
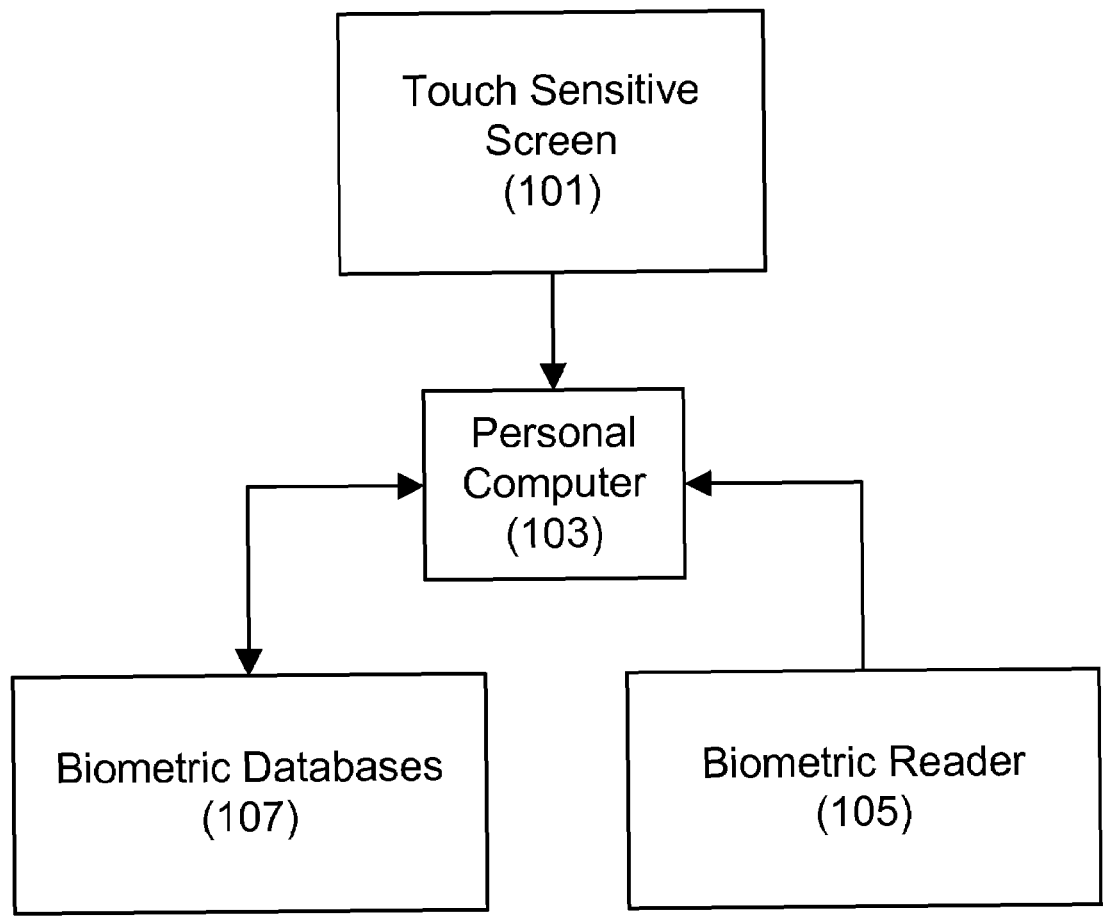
FIG. 1 illustrates schematically, one embodiment apparatus of the present invention.
Figure 2:
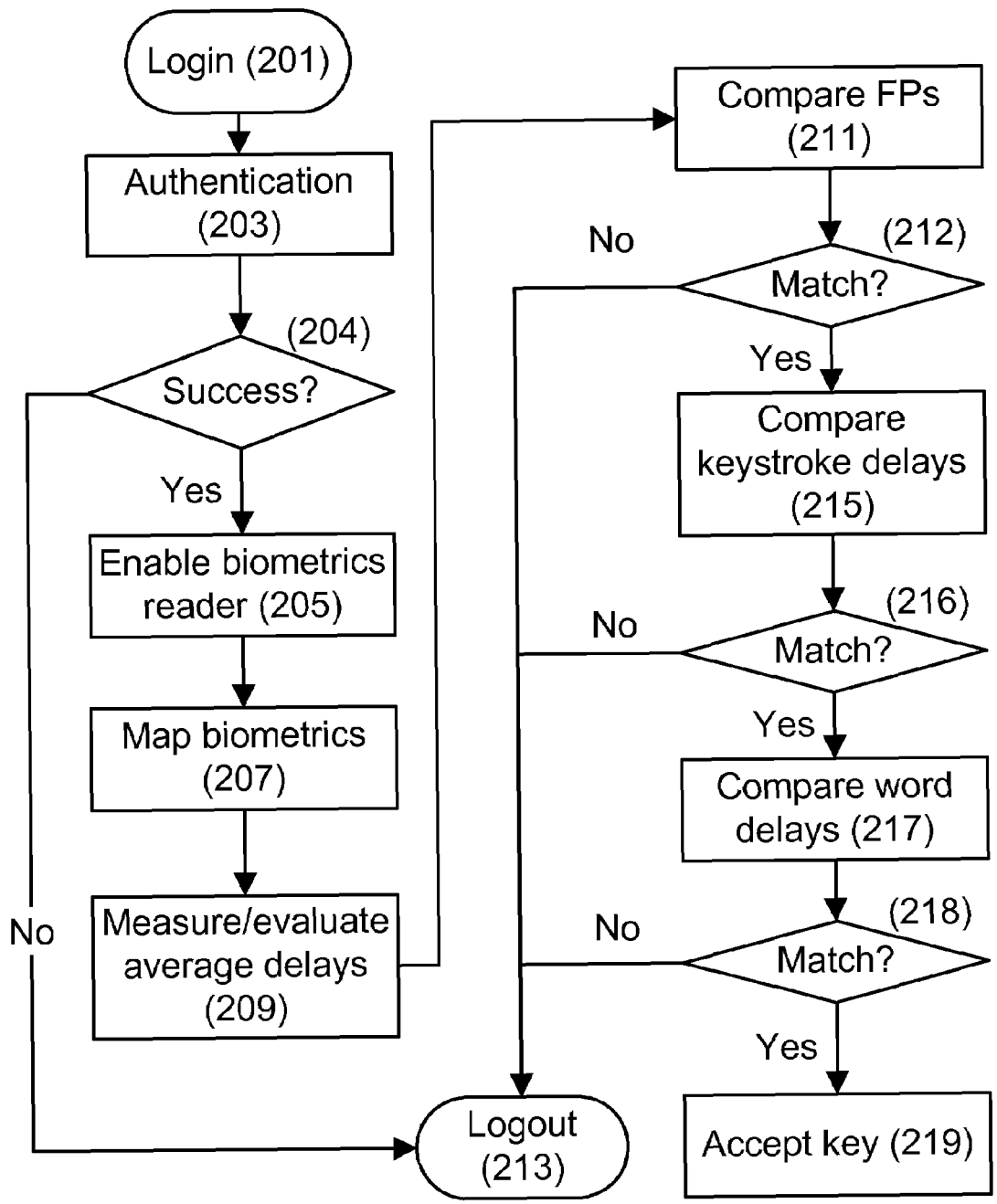
FIG. 2 is a data flow diagram showing the steps taken in the example embodiment of the present invention to make available a new method to authenticate a user using biometrics data.

In one embodiment, as shown in FIGS. 1 and 2, a method for on-type biometric fingerprint recognition for a soft keyboard system is presented.

The keyboard system comprises of a personal computer (103), a touch sensitive screen (101), a biometric reader (105), and one or more biometric databases (107).

A logging in (201) step in the method comprises a user typing the user identification and password on the soft keyboard.

The soft keyboard includes a set of soft keys, and the soft keyboard is displayed on the touch sensitive screen (101).

The biometric reader (105) reads the fingerprint of the user typing on the soft keyboard.

The personal computer is used for authenticating the user identification and the password (203), e.g. by checking against a local account in the personal computer or by delegating the authentication, for example to a server implementing a domain authentication mechanism or an LDAP server.

If the user identification and the password are not authenticated, the user is logged out (204) and no access is granted via the personal computer.

If the user identification and the password are authenticated, the personal computer loads the user's biometric database of the one or more biometric databases. For example, these databases may include directory servers or databases containing user profiles.

In this method the biometric reader (205) is enabled by the personal computer to receive the user's biometric information such as fingerprint.

The personal computer also maps the biometric fingerprint for every finger of the user to all the soft keys that the finger types, from the user's biometric database (207).

Another feature of the method is keystroke delay measurement (209) which is enabled via the personal computer. For example, the user keystrokes are associated with application or system events in the personal computer with corresponding event timestamp which can be used to measure the time delay between keystrokes.

These time stamped events are generated upon user's touching the touch screen and are subsequently mapped as keystrokes on the soft keyboard.

Another feature of the method is the measurement of delay between the typed words (209), which is enabled via the personal computer. For example, once the keystroke timing is determined, the method determines the word boundaries based on the typed string.

In one case, the delay between two consecutive words is determined based on the keystroke timing of the last character of the first word and the keystroke timing of the first character of the next word. In addition, keystrokes on special soft keys (e.g., SHIFT or ALT) can be taken into account, as well.

In this method, the user types on first soft key of the soft keys, and the personal computer reads the first soft key. In addition, the biometric reader scans the user's finger touching the first soft key, and the personal computer measures the keystroke delay (209).

Based on measurement of the keystroke delays, the personal computer calculates average keystroke delay (209).

Based on the measurement of delay between the words (209), the personal computer calculates the average delay between the words (209).

In this method, the personal computer compares the biometric fingerprint obtained from the biometric reader and the biometric fingerprint from the user's biometric database (211).

If the biometric fingerprint read from the biometric reader and the biometric fingerprint from the database match (212), the personal computer compares the average keystroke delay from measurement with a range of average keystroke delay obtained from the user's biometric database (215).

If the average keystroke delay is within the range of the average keystroke delay (216), the personal computer compares the average delay between the words from measurement and the range of average delay between the words obtained from the user's biometric database (217).

If the average delay between the words is within the range of average delay between the words (218), the personal computer accepts the first soft key (219). Otherwise, it logs out the user (213).

A system, apparatus, or device comprising one of the following items is an example of the invention: biometric module, fingerprinting device, database, memory, password, reader, keyboard, computer monitor, user identifier, user account, domain authentication, LDAP server, directory server, soft keyboard, touch-sensitive input/output device, or any display device, applying the method mentioned above, for purpose of security and access management.

Any variations of the above teaching are also intended to be covered by this patent application.

The invention claimed is:

1. A method for on-type biometric fingerprint recognition for a soft keyboard system, said system comprising of a personal computer, a touch sensitive screen, a biometric reader, and one or more biometric databases, said method comprising:

logging in,
   wherein said logging in comprises a user typing user identification and password on said soft keyboard,
   wherein said soft keyboard comprises a plurality of soft keys,
   wherein said soft keyboard is displayed on said touch sensitive screen,
   wherein said biometric reader reads fingerprint of said user typing on said soft keyboard;
said personal computer authenticating said user identification and said password;
   wherein if said user identification and said password are not authenticated, said user is logged out;
   if said user identification and said password are authenticated, said personal computer loading said user's biometric database of said one or more biometric databases;
said personal computer mapping biometric fingerprint for every finger of said user to all said soft keys that said finger types from said user's biometric database;
said personal computer enabling said biometric reader;
said personal computer enabling keystroke delay measurement;
said personal computer enabling delay between words measurement;
said user typing on first soft key of said soft keys;
said personal computer reading said first soft key and said biometric reader scanning finger touching said first soft key;
said personal computer measuring keystroke delay;
said personal computer calculating average keystroke delay;
said personal computer measuring delay between said words;
said personal computer calculating average delay between said words; and
said personal computer comparing first biometric fingerprint from said biometric reader and second biometric fingerprint from said user's biometric database,
   if said first biometric fingerprint and said second biometric fingerprint match,
      said personal computer comparing said average keystroke delay from measurement and keystroke delay average range from said user's biometric database,
      if said average keystroke delay is in range of said keystroke delay average range, said personal computer comparing said average delay between said words from measurement and delay between said words average range from said user's biometric database, if said average delay between said words is in range of said delay between said words average range, said personal computer accepting said first soft key, else
   logging out said user.

* * * * *